US012644303B1

(12) United States Patent
Steele

(10) Patent No.: US 12,644,303 B1
(45) Date of Patent: Jun. 2, 2026

(54) HURRICANE PROTECTION SYSTEM FOR PERSONAL BELONGINGS

(71) Applicant: Bryan G. Steele, Glen Burnie, MD (US)

(72) Inventor: Bryan G. Steele, Glen Burnie, MD (US)

( * ) Notice: Subject to any disclaimer, the term of this patent is extended or adjusted under 35 U.S.C. 154(b) by 183 days.

(21) Appl. No.: 18/639,607

(22) Filed: Apr. 18, 2024

(51) Int. Cl.

| | |
|---|---|
| ***E04H 9/14*** | (2006.01) |
| *B25B 9/00* | (2006.01) |
| *E02D 5/80* | (2006.01) |
| *E04H 15/02* | (2006.01) |
| *E21B 10/44* | (2006.01) |

(52) U.S. Cl.
CPC .................. *E04H 9/14* (2013.01); *B25B 9/00* (2013.01); *E02D 5/80* (2013.01); *E02D 5/803* (2013.01); *E04H 15/02* (2013.01); *E21B 10/44* (2013.01)

(58) Field of Classification Search
CPC .... B60P 7/02; B60P 7/04; A01F 25/13; A01F 25/14; Y10S 52/12; E04H 9/14; E04H 15/20; E04H 15/24; B65G 3/02
See application file for complete search history.

(56) References Cited

U.S. PATENT DOCUMENTS 5,522,184 A * 6/1996 Oviedo-Reyes .......... E04H 9/14 52/DIG. 11
7,673,912 B2 * 3/2010 Breininger ................ B25B 9/02 294/210
7,726,081 B1 6/2010 Bennardo et al.
8,215,072 B2 7/2012 Gorman
8,215,073 B2 7/2012 Gorman et al.
8,910,452 B2 12/2014 Noturno
9,021,750 B1 5/2015 Matulin
(Continued)

FOREIGN PATENT DOCUMENTS

CN 110043100 B * 12/2020 ............. E04H 9/145
CN 116946002 A * 10/2023 ................ B60P 7/04
(Continued)

OTHER PUBLICATIONS

Storm Nets. Product Listing [online]. Copyright 2011—All Outdoors Gear [retrieved on Aug. 11, 2023]. Retrieved from the Internet: <URL: http://www.alloutdoors.co.za/index_files/Page633.htm>.

(Continued)

*Primary Examiner* — Kyle J. Walraed-Sullivan
*Assistant Examiner* — Zakaria Khaled Al-Aswar
(74) *Attorney, Agent, or Firm* — Cramer Patent & Design, PLLC.; Aaron R. Cramer

(57) ABSTRACT

The hurricane protection system for personal belongings may comprise a net, a plurality of ground anchors, and a plurality of tethers. The hurricane protection system for personal belongings may be operable to secure items to the ground in preparation for a hurricane or other high-wind weather event. The net may be placed over the items and held in place by the plurality of tethers and the plurality of ground anchors. As non-limiting examples, the items may comprise lawn furniture, bicycles, motorcycles, children's toys, a swing set, outdoor tools, a grill, lawn mowers, an outdoor shed, a recreational vehicle, a mobile home, construction materials, athletic equipment, or any combination thereof.

2 Claims, 5 Drawing Sheets

(56) References Cited

U.S. PATENT DOCUMENTS

| | | | | |
|---|---|---|---|---|
| 9,481,404 | B1 * | 11/2016 | Rich | B62D 33/033 |
| 10,876,297 | B1 | 12/2020 | Poma et al. | |
| 10,982,703 | B2 | 4/2021 | Lajewardi | |
| 11,142,903 | B1 | 10/2021 | Jones, Jr. et al. | |
| 2008/0040981 | A1 * | 2/2008 | Lindstrom | E04H 9/14 52/30 |
| 2013/0199589 | A1 * | 8/2013 | Gaudet, Jr. | E04H 15/54 135/87 |
| 2014/0311049 | A1 * | 10/2014 | Siegmund | E04H 15/02 |
| 2020/0063455 | A1 * | 2/2020 | Riccobon | E04H 9/14 |
| 2021/0362642 | A1 * | 11/2021 | Delangis | B60P 7/0823 |
| 2022/0178140 | A1 * | 6/2022 | Dunlap | E04B 7/14 |

FOREIGN PATENT DOCUMENTS

| | | | | | |
|---|---|---|---|---|---|
| CN | 120100234 | A | * | 6/2025 | E02D 27/01 |
| CN | 113955569 | B | * | 9/2025 | B60P 7/04 |
| FR | 3078724 | A1 | * | 9/2019 | E04H 9/14 |

OTHER PUBLICATIONS

Golf Range Netting. Product Listing [online]. © 2024 [retrieved on Aug. 11, 2023]. Retrieved from the Internet: <URL: https://www.golfrangenetting.com/retractable-baseball-netting-harriton-high-school-pa/>.

* cited by examiner

HURRICANE PROTECTION SYSTEM FOR PERSONAL BELONGINGS

RELATED APPLICATIONS

None.

FIELD OF THE DEVICE

The presently disclosed subject matter is directed towards a hurricane protection system designed for securing personal belongings against damage caused by hurricanes and other high-wind weather events. Specifically, the system focuses on providing robust ground anchoring for a protective netting arrangement that covers and holds various items such as outdoor furniture, vehicles, recreational equipment, and construction materials securely to the ground to prevent them from being blown away or damaged during storms.

BACKGROUND OF THE DEVICE

Hurricanes and high-wind events pose significant risks to personal property, often resulting in substantial loss and damage to unsecured outdoor items. Traditional methods for securing items typically involve makeshift solutions such as using weighted covers or simply storing items indoors, which may not be feasible for larger or permanently situated objects. Furthermore, these conventional methods often fail under extreme conditions, leading to the need for a more effective and reliable system. The background of this device centers on addressing these challenges by offering a comprehensive solution that combines enhanced material strength, strategic design elements, and advanced anchoring technology to ensure maximum protection and stability of personal belongings during severe weather events. This system integrates durable materials, specialized stitching techniques, and innovative anchoring mechanisms to deliver a scalable and adaptable solution that meets the diverse needs of users residing in hurricane-prone areas.

SUMMARY OF THE DEVICE

Embodiments of the present disclosure may include a hurricane protection system including a net configured to cover and retain personal items. In some embodiments, the net includes a plurality of longitudinal straps and a plurality of lateral straps interwoven to. Embodiments may also include, form a mesh structure. Embodiments may also include a plurality of reinforced intersections between the plurality of longitudinal.

Embodiments may also include straps and the plurality of lateral straps. In some embodiments, the plurality of reinforced intersections may include triple concentric square stitches. Embodiments may also include a plurality of ground anchors, each including a helical pier with at least one helix plate that may be deformable into a helical.

Embodiments may also include shape for insertion into the ground. Embodiments may also include a central shaft. Embodiments may also include an attachment point configured to connect to tethers. Embodiments may also include a plurality of tethers connecting the net to the plurality of ground anchors to secure. In some embodiments, the net against high winds.

Embodiments may also include a plurality of eyelets may be distributed along a periphery of the net, each eyelet configured to facilitate the attachment of the net to the ground anchors via the tethers. In some embodiments, the system may include a plurality of carabiners and spring tensioners to facilitate adjustable and secure attachment of the net to the ground anchors.

In some embodiments, the net may be configurable to extend over various dimensions of personal items, a dimensions including lengths from eight to one hundred feet and widths from twenty to thirty feet. In some embodiments, the net and the tethers may be made of materials selected from the group consisting of nylon, polyester, polypropylene, aromatic polyamides, canvas, leather, and any combination thereof.

In some embodiments, the system may include a push/pull grappler pole configured to facilitate an installation of the net and a positioning of the tethers. In some embodiments, the tethers may include materials selected from the group consisting of bungee cords, ratcheting cargo straps, steel cables, metal chains, and any combination thereof.

In some embodiments, the net includes a plurality of gaps sized ten inches or smaller, arranged to control the size and spacing of openings within the mesh structure to retain specific items. Embodiments may also include two or more nets can be coupled to form a larger net via coupling elements located on a longitudinal or lateral edges of adjacent nets. Embodiments may also include a grappler pole may include a telescoping handle, a pull hook, and a push prong.

Embodiments of the present disclosure may also include a method for securing personal items during high-wind events, the method including placing a net over an item. Embodiments may also include anchoring the net to a portion of ground using a plurality of ground anchors. Embodiments may also include connecting the net to the ground anchors using a plurality of tethers.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
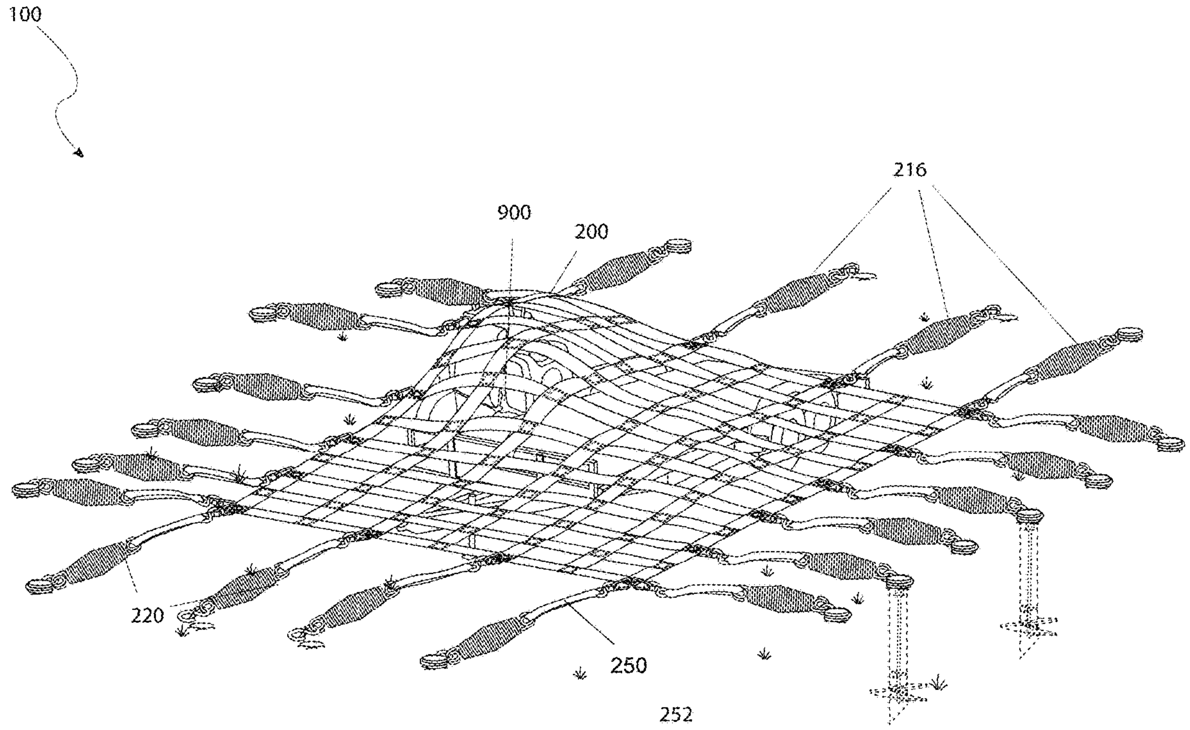
FIG. 1 is an in-use view of a hurricane protection system for personal belongings 100, according to an embodiment of the present device.
Figure 2:
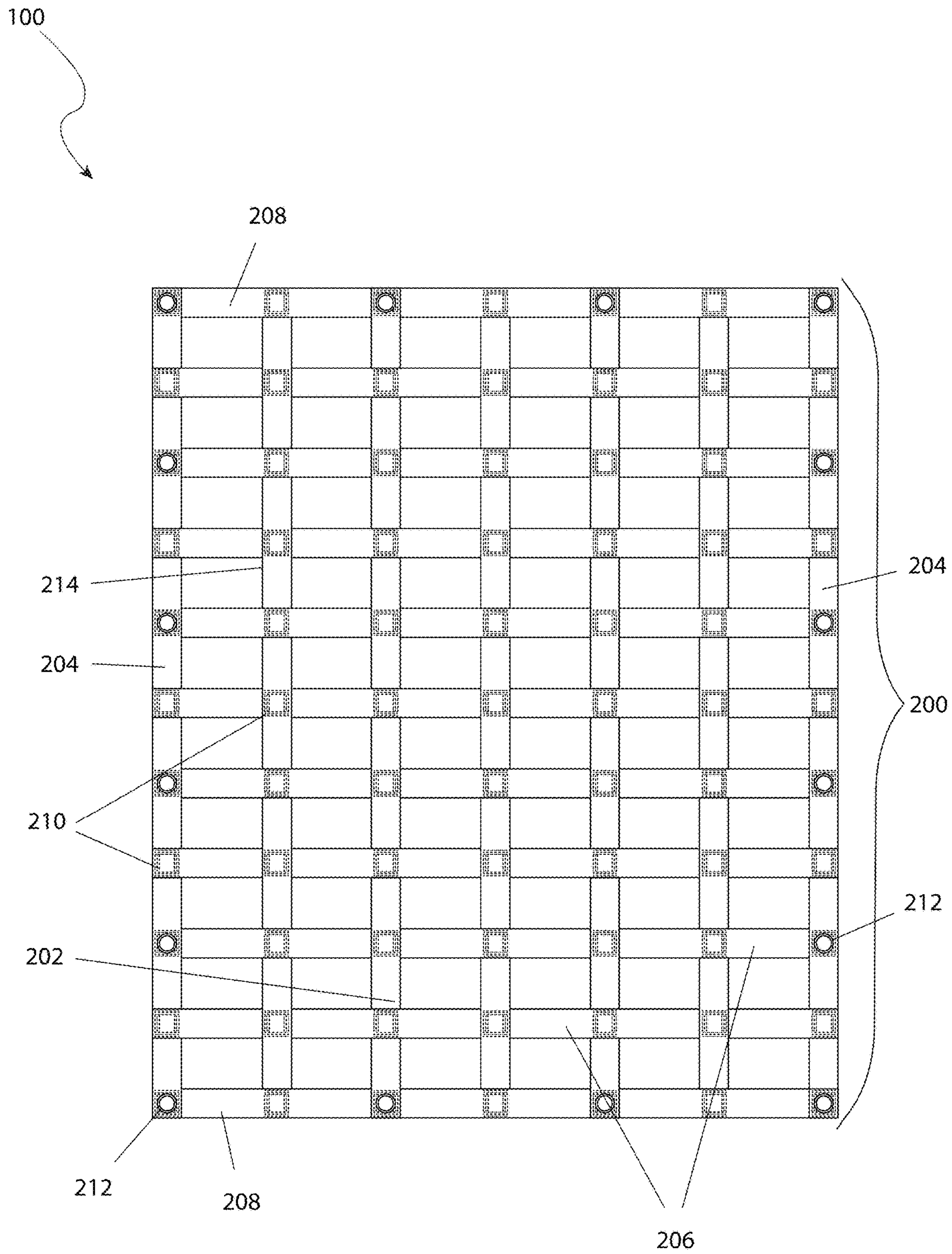
FIG. 2 is a top view of a hurricane protection system for personal belongings 100, according to an embodiment of the present device, illustrating a net 200.
Figure 3:
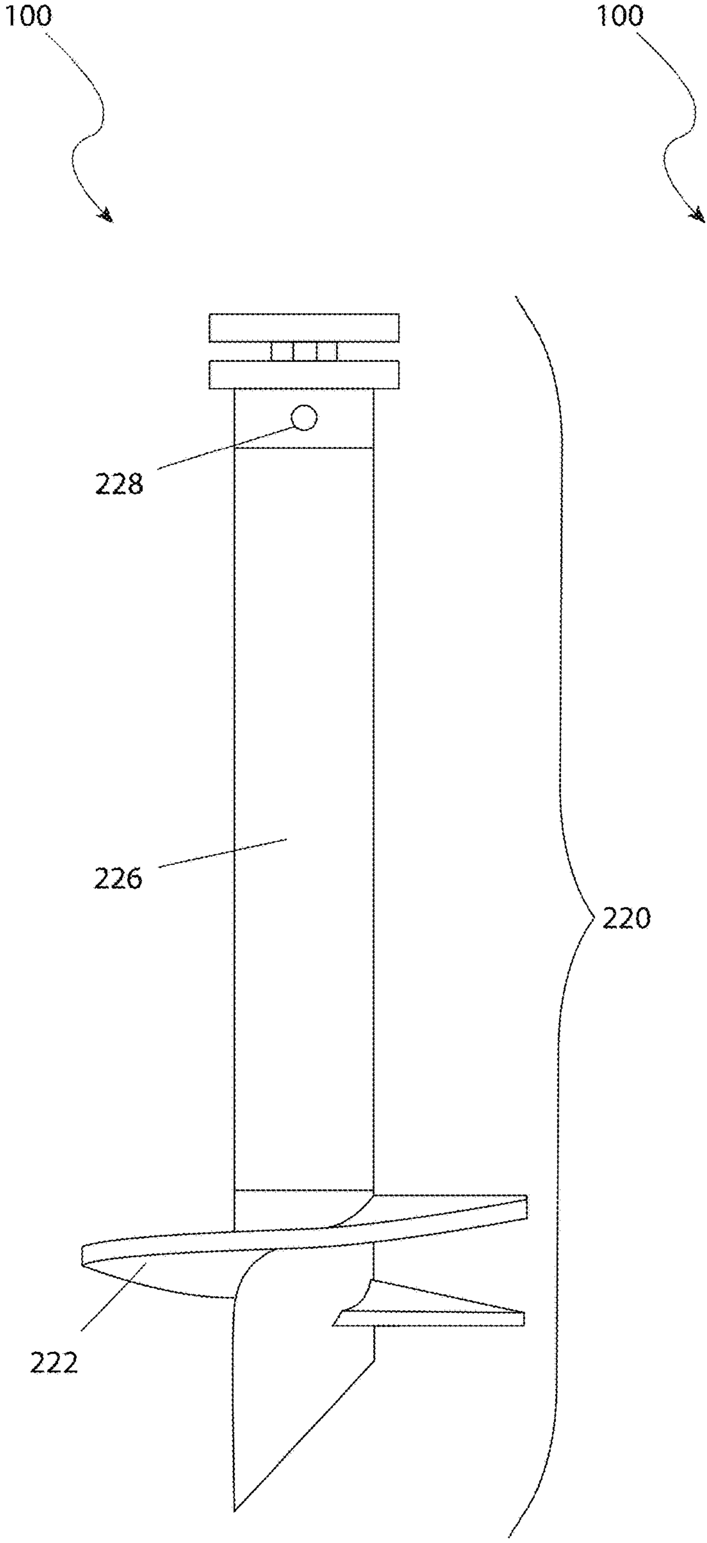
FIG. 3 is a side view of a hurricane protection system for personal belongings 100, according to an embodiment of the present device, illustrating a ground anchor 220.
Figure 4:
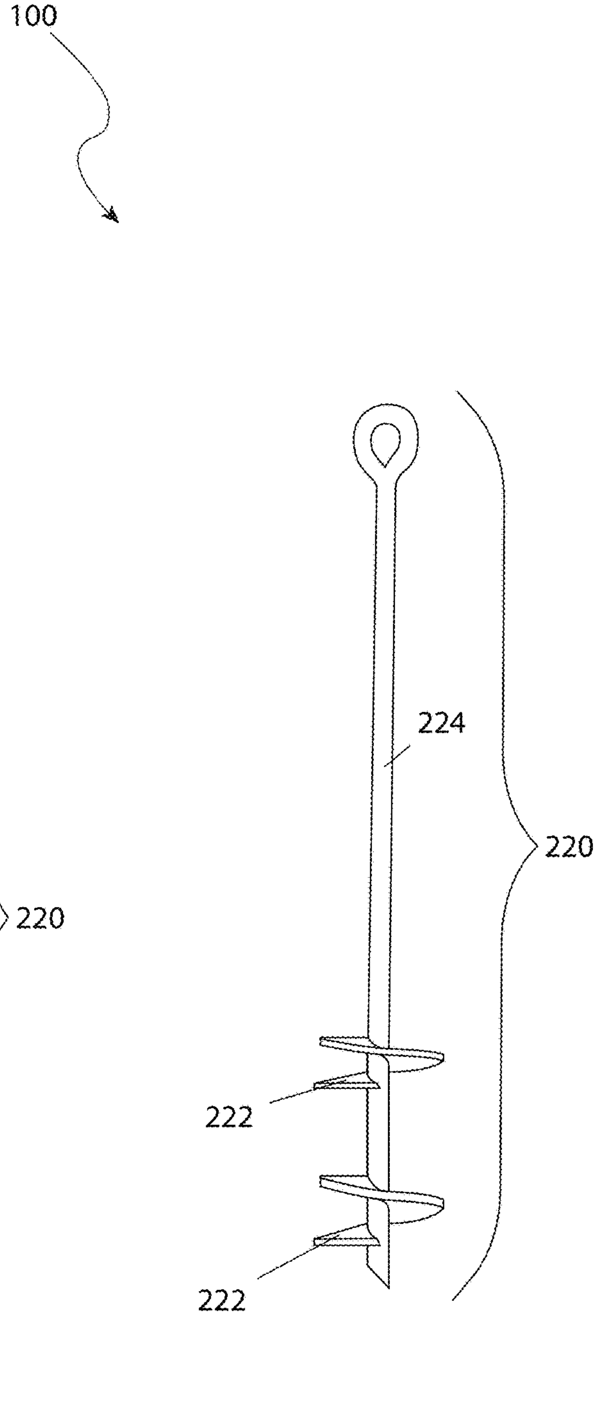
FIG. 4 is a side view of a hurricane protection system for personal belongings 100, according to an embodiment of the present device, illustrating a ground anchor 220.
Figure 5:
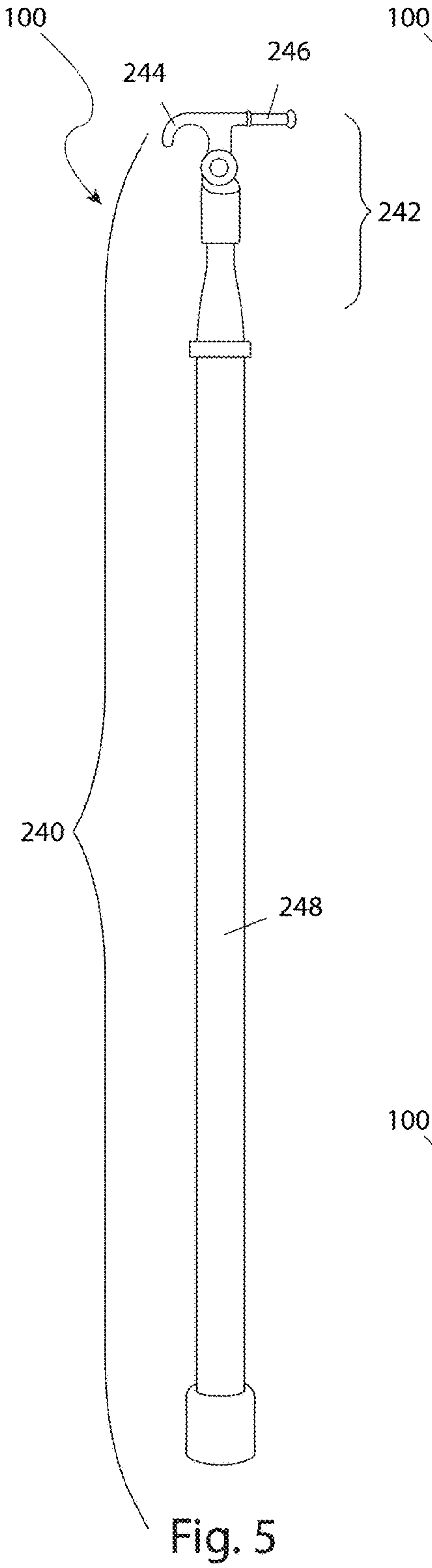
FIG. 5 is a side view of a hurricane protection system for personal belongings 100, according to an embodiment of the present device, illustrating a push/pull grappler pole 240.
Figure 6:
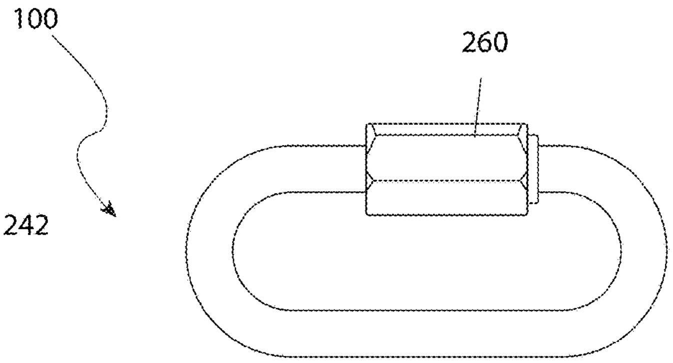
FIG. 6 is a side view of a hurricane protection system for personal belongings 100, according to an embodiment of the present device, illustrating a carabiner 260.
Figure 7:
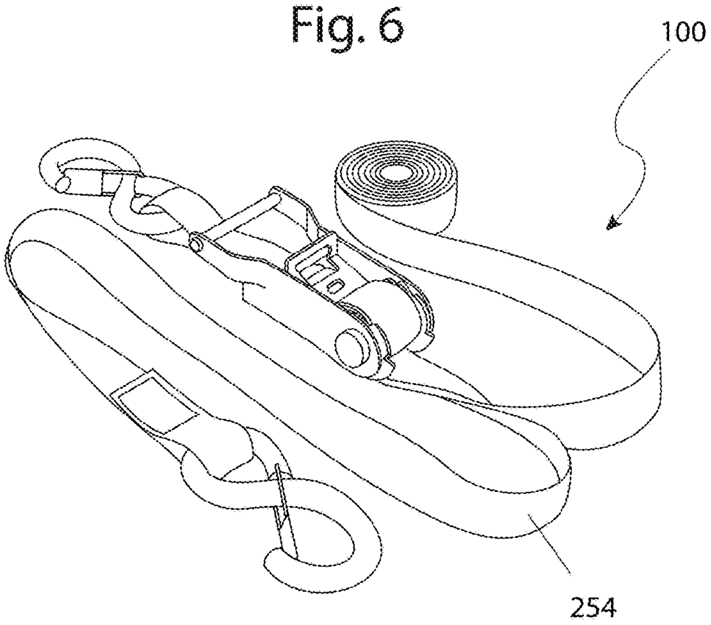
FIG. 7 is an isometric view of a hurricane protection system for personal belongings 100, according to an embodiment of the present device, illustrating a ratcheting cargo strap 254.
Figure 8:
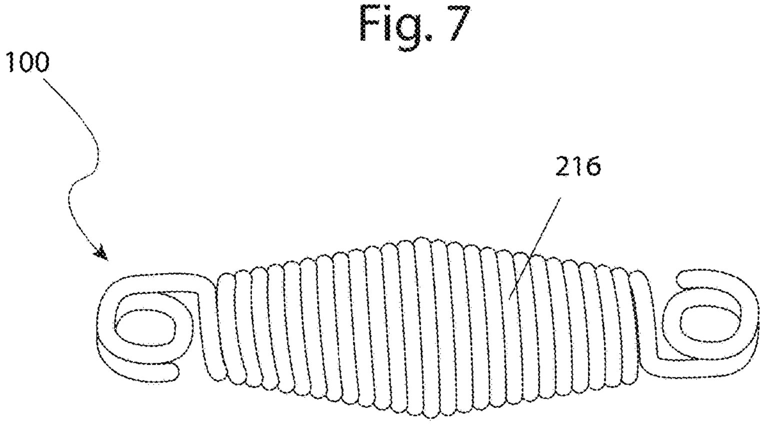
FIG. 8 is an isometric view of a hurricane protection system for personal belongings 100, according to an embodiment of the present device, illustrating a spring tensioner 216.
Figure 9A:
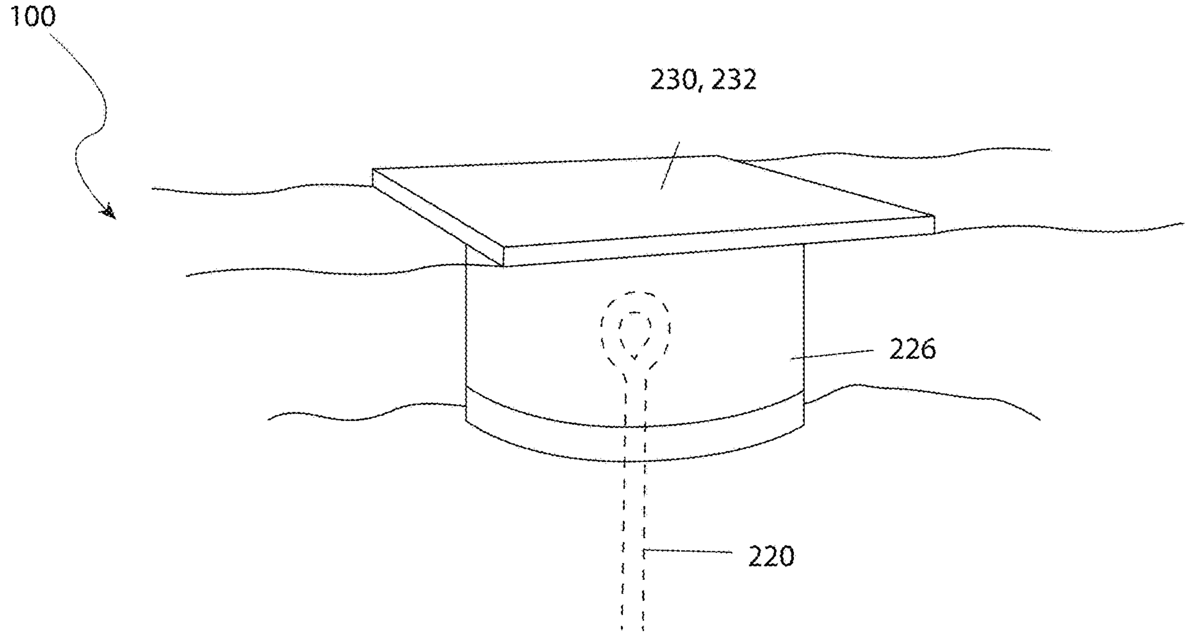
FIG. 9*a* is an isometric view of a hurricane protection system for personal belongings 100, according to an embodiment of the present device, illustrating a sleeve cap 230 comprising a square top 232; and, FIG. 9*b* is an isometric view of a hurricane protection system for personal belongings 100, according to an embodiment of the present device, illustrating a sleeve cap 230 comprising a round top 234.
Figure 9B:
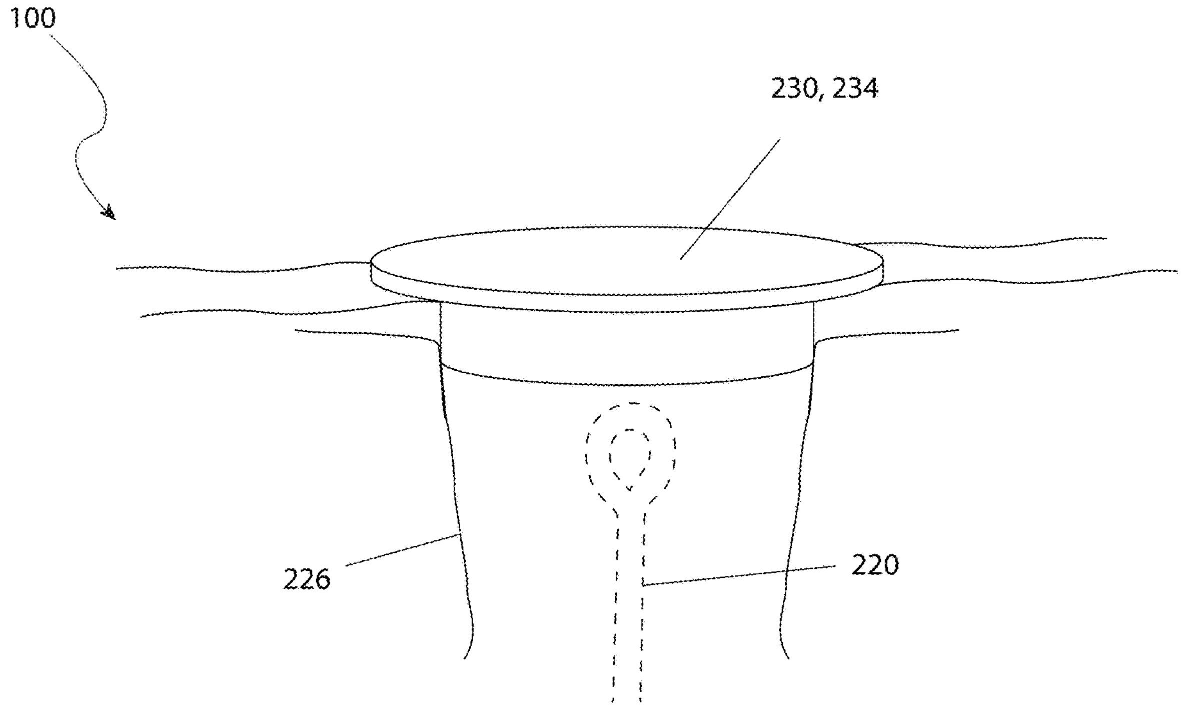

100 hurricane protection system
200 net
202 longitudinal strap
204 longitudinal edge strap
206 lateral strap
208 lateral edge strap
210 triple stitching
212 eyelet
214 intersection
216 spring tensioner
220 ground anchor
222 helix plate
224 central shaft
226 sleeve
228 attachment point
230 sleeve cap
232 square top
234 round top
240 grappler pole
242 head
244 pull hook
246 push prong
248 handle
250 tether
252 bungee cord
254 ratcheting cargo strap
260 carabiner
900 items 1. Description of the Device The present device is directed to a hurricane protection system for personal belongings (herein described as the "device") 100. The device 100 may comprise a net 200, a plurality of ground anchors 220, and a plurality of tethers 250. The device 100 may be operable to secure items 900 to the ground in preparation for a hurricane or other high-wind weather event. The net 200 may be placed over the items 900 and held in place by the plurality of tethers 250 and the plurality of ground anchors 220. As non-limiting examples, the items 900 may comprise lawn furniture, bicycles, motorcycles, children's toys, a swing set, outdoor tools, a grill, lawn mowers, an outdoor shed, a recreational vehicle, a mobile home, construction materials, athletic equipment, or any combination thereof.

The net 200 may comprise a plurality of longitudinal straps 202, a plurality of lateral straps 206, and a plurality of eyelets 212. The plurality of longitudinal straps 202 may be adjacent longitudinal parallel straps 202 are oriented parallel and separated by a first set of gaps. The plurality of lateral straps 206 may be adjacent lateral straps 206 are oriented parallel and separated by a second set of gaps. The plurality of longitudinal straps 202 may be oriented perpendicularly to the plurality of lateral straps 206. The plurality of longitudinal straps 202 and the plurality of lateral straps 206 may define a mesh that may retain the items 900 located beneath the net 200.

The plurality of longitudinal straps 202 and the plurality of lateral straps 206 may be interwoven such that the plurality of longitudinal straps 202 alternately pass above and below the plurality of lateral straps 206, and vice versa. Intersections 214 of the plurality of longitudinal straps 202 and the plurality of lateral straps 206, including longitudinal edge straps 204 and lateral edge straps 208, may be stitched to couple the plurality of longitudinal straps 202 to the plurality of lateral straps 206. In a preferred embodiment, each of the intersections 214 may comprise a triple stitching 210 for maximum strength of the net 200. As a non-limiting example, the triple stitching 210 may comprise three (3) concentric square stitches at each of the intersections 214.

The longitudinal edge straps 204 may be the opposing outermost ends of the plurality of longitudinal straps 202. The lateral edge straps 208 may be the opposing outermost ends of the plurality of lateral straps 206. The plurality of eyelets 212 may be distributed around the periphery of the net 200 and may be coupled to the net 200 on the longitudinal edge straps 204 and the lateral edge straps 208. The plurality of eyelets 212 may be metal rings surrounding apertures in the longitudinal edge straps 204 and the lateral edge straps 208. The plurality of eyelets 212 may be operable to couple the net 200 to the plurality of ground anchors 220 using the plurality of tethers 250 in order to hold the net 200 down in the face of high wind.

As non-limiting examples, the plurality of longitudinal straps 202 and the plurality of lateral straps 206 may be made of nylon, polyester, polypropylene, aromatic polyamides, canvas, leather, or any combination thereof.

An individual longitudinal strap 202 and an individual lateral strap 206 may be at least one inch (1.0 in.) wide. In a preferred embodiment, the plurality of longitudinal straps 202, the longitudinal strap edge 204, the plurality of lateral straps 206, the lateral strap edge 208 may be between three and one-half and four and one-half inches (3½-4½ in.) wide.

The net 200 may be made available in any dimensions. In a preferred embodiment, the net 200 may be eight to one hundred feet (80-100 ft.) long in the longitudinal direction and twenty to thirty feet (20-30 ft.) wide in the lateral direction. The first set of gaps and the second set of gaps may be ten inches (10.0 in.) or smaller. In some embodiments, the net 200 may be square in which case the assignment of longitudinal and lateral orientations may be made arbitrarily.

The plurality of ground anchors 220 may be driven into the ground to create stable points of restraint for the net 200. The net 200 may be detachably coupled to the plurality of ground anchors 220 using the plurality of tethers 250. As a non-limiting example, the plurality of ground anchors 220 may be a plurality of helical piers An individual helical pier may comprise at least one (1) helix plate 222, a central shaft 224, and an attachment point 228. Each helix plate 222 may be operable to pull the individual helical pier down into the ground as the individual helical pier is rotated about a vertical axis extending through the central shaft 224. Each of the helix plates 222 may be a disk split along a straight line from the center to the edge. The two (2) outermost corners created by the split may be pulled in opposite directions that are perpendicular to the disk such that the disk is deformed into a helical shape. The helix plate 222 may be coupled to the bottom end of the central shaft 224.

The central shaft 224 may be a vertically-oriented armature. The attachment point 228 may be located at the top of the central shaft 224. As a non-limiting example, the attachment point 228 may be a horizontally-oriented aperture through the top of the central shaft 224. In a preferred embodiment, the central shaft 224 may be four feet with an error of one-half foot (4.0+/−0.5 ft.) in height.

In some embodiments, the central shaft 224 may be protected from burial below ground level by a sleeve 226. The sleeve 226 may be a hollow cylinder that may separate the central shaft 224 from the soil. The top of the sleeve 226 may be covered by a sleeve cap 230. The sleeve cap 230 may be removable in order to access the attachment point 228. As non-limiting examples, the sleeve cap 230 may comprise a square top 232 or a round top 234 for aesthetics.

The plurality of tethers 250 may couple the net 200 to the plurality of ground anchors 220 in order to hold the net 200 in place in the presence of high wind. As non-limiting examples, the plurality of tethers 250 may be bungee cords 252, ratcheting cargo straps 254, steel cables, metal chains, or any combination thereof. In some embodiments, a plurality of carabiners 260, plurality of spring tensioners 216, quick links, screw links, or any combination thereof may be used to couple the plurality of tethers 250 to the net 200, the plurality of tethers 250 to the plurality of ground anchors 220, or both.

In some embodiments, the plurality of carabiners 260, plurality of spring tensioners 216, quick links, screw links, or any combination thereof may be used to couple two (2) adjacent nets 200 to form one (1) larger net 200. The two (2) adjacent nets 200 may be coupled between the plurality of eyelets 212 of two (2) adjacent longitudinal edge straps 204 or two (2) adjacent lateral edge straps 206 selected from the two (2) adjacent nets 200.

In some embodiments, the device 100 may comprise a push/pull grappler pole 240 that may be operable to install the net 200, the plurality of tethers 250, or both. The grappler pole 240 may comprise a head 242 and a handle 248. The head 242 may comprise a pull hook 244 for pulling the net 200 or the plurality of tethers 250, a push prong 246 for pushing the net 200 or the plurality of tethers 250, or both. The handle 248 may be adapted to be grasped by a user during use. In some embodiments, the handle 248 may telescopically extend and retract in length.

In use, the items 900 to be secured during a hurricane may be collected into a common area. Alternatively, larger items 900 such as an outdoor shed, a recreational vehicle, a mobile home, construction materials, and the like may be secured where they sit, possibly with smaller items 900 gathered around the base of the larger items 900. The items 900 may be covered by placing the net 200 over the top of the items 900. The plurality of ground anchors 220 may be positioned around the items 900 by augering the plurality of ground anchors 220 into the ground beyond the net 200. The net 200 may be secured to the plurality of ground anchors 220 by coupling the plurality of tethers 250 between the plurality of ground anchors 220 and the plurality of eyelets 212 on the net 200. Spring tensioners 216 and carabiners 260 may be used to aid in securing the net 200 to the ground anchors 220.

To enhance the effectiveness and specificity of the hurricane protection system (100), a detailed embodiment is presented that integrates every component mentioned in the specification. The system consists of a net (200) specifically designed to cover and protect various personal belongings (900) from high-wind conditions. The net (200) consists of a robust configuration of interwoven longitudinal straps (202) and lateral straps (206), each strap being sufficiently wide to provide secure coverage while maintaining flexibility. The intersections (214) of these straps are reinforced with triple stitching (210), ensuring maximum durability and resistance to tearing under strain. The edge of the net (200) is defined by longitudinal edge straps (204) and lateral edge straps (208), each outfitted with metal eyelets (212) distributed around their periphery. These eyelets (212) serve as secure points for attaching the net (200) to the ground anchors (220) using a variety of tethers (250), which consist of bungee cords (252) and ratcheting cargo straps (254) for adaptable and resilient fastening. Each ground anchor (220) features a helical pier with a helix plate (222) capable of easy insertion into the soil due to its helical design, which is engineered to provide increased stability. The central shaft (224) of each anchor is protected from direct contact with soil by a sleeve (226), topped with a removable sleeve cap (230), available in designs such as a square top (232) or a round top (234), enhancing both functionality and aesthetic appeal. To facilitate the setup and adjustment of the system, spring tensioners (216) and carabiners (260) are included. These components allow for quick adjustments and secure fastening of the net (200) to the ground anchors (220), accommodating varying conditions and sizes of the area to be secured. Furthermore, for efficient deployment and management of the net (200) and tethers (250), the system includes a push/pull grappler pole (240). This pole consists of a multi-functional head (242) featuring a pull hook (244) and a push prong (246), attached to a telescoping handle (248) that can be adjusted to suit the user's height and reach, facilitating easier manipulation of the net and tethers. This specific version of the hurricane protection system is designed to offer a comprehensive solution for securing a wide array of items (900) such as outdoor furniture, vehicles, and other valuables, ensuring they remain anchored and protected even in the face of severe hurricanes and high-wind events. The detailed configuration of each element of the system maximizes both usability and effectiveness, providing a reliable means of disaster preparation for residential and commercial settings.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A hurricane protection system for securing personal items comprising:

a net configured to cover and retain personal items, the net comprising:

a plurality of longitudinal straps and a plurality of lateral straps interwoven such that the plurality of longitudinal straps alternately pass above and below the plurality of lateral straps to form a mesh structure, wherein individual longitudinal straps and individual lateral straps are at least one inch wide;

a plurality of intersections between the plurality of longitudinal straps and the plurality of lateral straps, each intersection reinforced with a triple stitching comprising three concentric square stitches;

a plurality of eyelets distributed around a periphery of the net on longitudinal edge straps and lateral edge straps of the net, each eyelet being a metal ring surrounding an aperture in the longitudinal edge straps and lateral edge straps and configured to facilitate attachment of the net to ground anchors via tethers;

a plurality of ground anchors driven into the ground around the net to create points of restraint, each ground anchor comprising:

a helical pier comprising at least one helix plate and a central shaft, wherein each helix plate is a disk split along a straight line from a center to an edge such that two outermost corners of the disk are pulled in opposite directions perpendicular to the disk to deform the disk into a helical shape for insertion into the ground, and wherein the helix plate is coupled to a bottom end of the central shaft;

an attachment point located at a top of the central shaft and configured to connect to tethers; and, a sleeve configured to protect the central shaft from burial below ground level by separating the central shaft from soil, wherein a top of the sleeve is covered by a removable sleeve cap that is removable to provide access to the attachment point;

a plurality of tethers detachably coupling the plurality of eyelets of the net to the attachment points of the plurality of ground anchors to hold the net down; and, a plurality of carabiners and a plurality of spring tensioners configured to couple the plurality of tethers to the net and to the plurality of ground anchors to facilitate adjustable attachment of the net to the plurality of ground anchors.

2. The hurricane protection system of claim 1, further comprising a push/pull grappler pole configured to facilitate installation of the net and positioning of the tethers, wherein the grappler pole comprises a telescoping handle, a pull hook, and a push prong.

* * * * *